United States Patent [19]
Gröne

[11] Patent Number: 5,500,197
[45] Date of Patent: Mar. 19, 1996

[54] PROCESS OF PURIFYING GYPSUM

[75] Inventor: Dieter Gröne, Frankfurt am Main, Germany

[73] Assignee: Metallgesellschaft Aktiengesellschaft, Frankfurt am Main, Germany

[21] Appl. No.: 784,580

[22] Filed: Oct. 29, 1991

[30] Foreign Application Priority Data

Oct. 30, 1990 [DE] Germany .................... 40 34 497.5

[51] Int. Cl.$^6$ ................ B04C 5/26; C01B 17/22; C01F 11/46; C01F 5/12
[52] U.S. Cl. ............... 423/243.08; 423/170; 423/555; 106/786; 209/729
[58] Field of Search .................. 423/170, 171, 423/172, 555, 243.08; 106/775, 782, 705, 786; 209/729

[56] References Cited

U.S. PATENT DOCUMENTS

| 326,047 | 9/1885 | Manning | 423/555 |
|---|---|---|---|
| 3,410,655 | 11/1968 | Ruter et al. | 423/170 |
| 4,503,020 | 3/1985 | Weissert et al. | 423/555 |
| 4,612,173 | 9/1986 | Gosch et al. | 423/555 |
| 4,976,936 | 12/1990 | Rathi et al. | 423/555 |
| 5,015,450 | 5/1991 | Koslowski | 423/171 |

FOREIGN PATENT DOCUMENTS

| 2704577 | 8/1978 | Germany | 423/555 |
|---|---|---|---|
| 57-22118 | 2/1982 | Japan | 423/170 |
| 8907576 | 8/1989 | WIPO | 423/555 |

OTHER PUBLICATIONS

Krebs Cyclowash, Krebs Engineers, 1705 Chrysler Drive Menlo Park CA Mar. 79.

*Primary Examiner*—Gary P. Straub
*Attorney, Agent, or Firm*—Michael J. Striker

[57] ABSTRACT

The process for purifying gypsum suspensions, particularly those formed in a flue gas desulfurizing plant, includes feeding the gypsum suspension (9) to a first hydrocyclone (1), which is operated to produce an underflow (11) with a comparatively high underflow concentration and an overflow fed to a collecting tank (2). The underflow (11) of the first hydrocyclone stage is further diluted to a form another underflow with a lower solids content in a suspension tank (3) and then is fed to a second hydrocyclone stage (4), the overflow of which is also fed to the collecting tank (2). Depending on purity of the gypsum required or attained, the gypsum contained in an underflow (14) of the second hydrocyclone stage (4) is either immediately dewatered and removed or is first fed to one or more hydrocyclone stages, which operate analogously. The combined overflows (15) of the first and second or further hydrocyclone stages are fed from the collecting tank (2) to a third hydrocyclone stage (6). In a thickener (8) solid particles are removed from the overflow (17) of the third hydrocyclone (6) and the clear effluent (23), which is an overflow from the thickener (8), is used for diluting in the suspension tank (3).

9 Claims, 2 Drawing Sheets

PROCESS OF PURIFYING GYPSUM

BACKGROUND OF THE INVENTION

The present invention relates to a process of purifying gypsum using hydrocyclones. Gypsum suspensions which are purified using hydrocyclones are generated mainly in flue gas desulfurizing plants which are supplied with an aqueous suspension of a low-grade limestone.

Hydrocyclones are used in engineering methods in various ways to grade and/or thicken aqueous suspensions. Such apparatus combinations have already been described in an article by W. Grundelach and H.F.Trawinski entitled "Der Hydrozyklon" in Chemie-Ing.-Techn., 32nd Year (1960), No. 4, on pages 279 to 284. In accordance with German Patent 36 07 191, hydrocyclones are also used to remove dissolved salts and minute particles from absorption solutions of flue gas desulfurizing plants, i.e. to remove gypsum.

The previously proposed processes and apparatus combinations have the disadvantage that gypsum particles and minute inert particles are not adequately separated and the overall liquid balance is unfavorable.

SUMMARY OF THE INVENTION

It is an object of the present invention to produce a high-purity gypsum, preferably in flue gas desulfurizing plants supplied with low-grade limestone, without adversely affecting the overall water balance.

According to the invention, this method includes feeding the aqueous gypsum suspension to a first hydrocyclone stage, which is operated to provide an overflow and an underflow with a comparatively high underflow concentration, and feeding the overflow from the first hydrocyclone stage to a collecting tank. Then the underflow of the first hydrocyclone stage is diluted in a suspension tank to a lower solids content and is fed to a second hydrocyclone stage, the overflow of which is also fed to the collecting tank associated with the first hydrocyclone stage. The gypsum contained in the underflow of the second hydrocyclone stage is removed and dewatered by a belt filter, a centrifuge or the like and is thus removed from the process. The combined overflows from the first and second hydrocyclone stages are supplied from the collecting tank to a third hydrocyclone stage. The overflow of the third hydrocyclone stage is fed to a thickener, in which solid particles are removed, optionally with the assistance of flocculating agents, if necessary. The impurities contained in the underflow of the thickener stage are withdrawn and disposed. They consist of minute particles of impurities removed from the gypsum or, in flue gas desulfurizing plants, of the inert particles contained in the limestone employed and of particles, which are contained in and have been co-scrubbed from the flue gas, such as heavy metal oxides, ash and soot. The clear water which is obtained is supplied through an intermediate tank into the suspension tank, which follows the first hydrocyclone stage, and is used to dilute the underflow of the first hydrocyclone stage. The underflow of the third hydrocyclone stage is re-used to form a limestone suspension which can, e.g., be fed to flue gas desulfurization plant.

Further advantages afforded by the process are:

a) a controlled removal of the impurities consisting of minute solid particles, b) avoidance of an adverse effect on the liquid balance of the overall process, because the clear effluent from the thickener is re-used to dilute the highly thickened suspension from the first hydrocarbon stage, and c) recovery of dewatered gypsum having a high purity as an end product, even if the starting suspensions are highly contaminated.

Advantages reside in the first place in the favorable water balance of the flue gas desulfurizing process and in the second place in the introduction of nuclei for crystallization of gypsum into the limestone suspension.

It has been found that the process, which produces a gypsum having a purity of at least 95%, can desirably be carried out in such a manner that the underflow withdrawn from the first hydrocyclone stage has a solids concentration of 60 to 80% by weight and is diluted in the following suspension tank to a solids concentration of 5 to 20% by weight. The underflow withdrawn from the second hydrocyclone stage has a solids concentration of 40 to 60% by weight. The overflow of the thickening stage is adjusted, optionally with the assistance of flocculating agents, to a solids concentration below 2 g/l.

If a large amount of impurities must be removed or if the gypsum is required to have a comparatively high purity, one or more hydrocyclone stages and associated suspension tanks may be connected between the first and second hydrocyclone stages and operated in analogy to the first hydrocyclone stage and the following suspension tank, respectively.

From the economic standpoint, the use of a belt filter for removing the purified gypsum from the underflow of the second hydrocyclone stage and for dewatering the gypsum has proved satisfactory.

The process is preferably used to purify gypsum suspensions which are formed in flue gas desulfurizing plants, especially by wet scrubbing of flue gas. In that case the underflow of the third hydrocyclone stage is used to produce the chemisorbing solution, preferably consisting of a limestone suspension, which is used to bind the sulfur oxides.

A plurality of hydrocyclones and associated suspension tanks may be connected between the first and second hydrocyclones and operated analogously.

Gypsum may also be obtained from the last or third hydrocyclones stage using a belt filter.

BRIEF DESCRIPTION OF THE DRAWING

The objects, features and advantages of the present invention will now be illustrated in more detail by the following detailed description, reference being made to the accompanying drawing in which:

The two figures are flow diagrams showing the flow of materials between parts of a plant performing the process for purifying gypsum according to the present invention.

DETAILED DESCRIPTION OF THE PREFERRED EMBODIMENT

Figure 1:
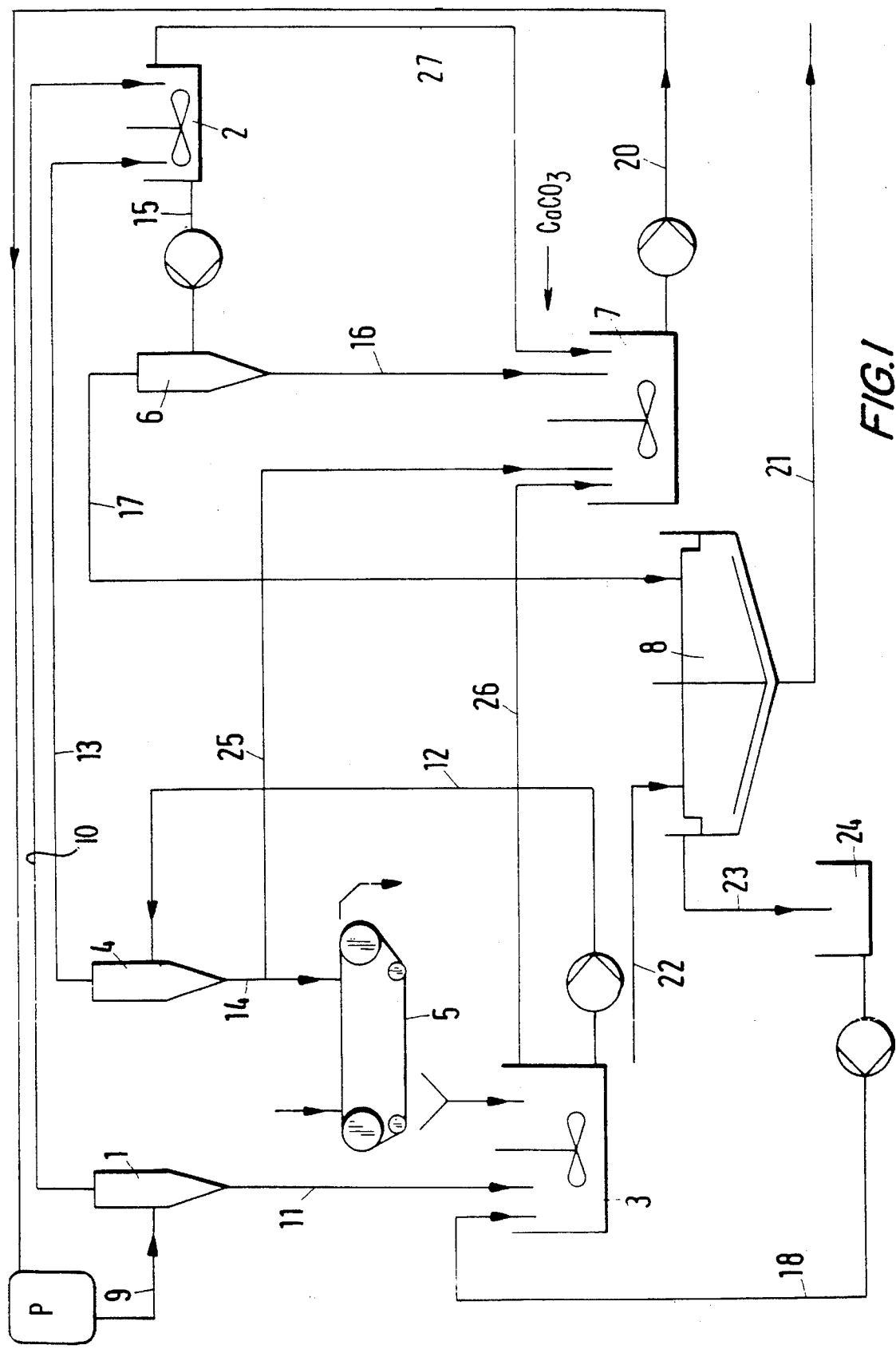

A gypsum suspension formed in a wet-process flue gas desulfurizing plant p and having a solids content of 10% by weight is fed through a feed line 9 to a hydrocyclone 1, which produces an overflow 10 and an underflow 11, the underflow 11 of which contains 70% by weight solids. The overflow 10 of the first hydrocyclone 1 is fed to a collecting tank 2. The underflow 11 of the first hydrocyclone stage is diluted in a suspension tank 3 to a solids content of 10% by weight and is fed through line 12 to a second hydrocyclone 4 in a second hydrocyclone stage, the overflow 13 of which is also fed to collecting tank 2 associated with the first hydrocyclone stage. The gypsum contained in the underflow 14 of the second hydrocyclone 4 is removed and dewatered by a belt filter 5 and is thus removed from the process. The combined overflows 15 of the first and second hydrocyclones 1 and 4 are fed from the collecting tank 2 to a third hydrocyclone 6 in a third hydrocyclone stage. The overflow 17 of the third hydrocyclone stage from the hydrocyclone 6 is fed to a thickener 8, in which solid particles are removed, with the assistance of flocculating agents, if required, to leave a residual solids content below 2 g/l. The impurities are withdrawn in the underflow 21 of the thickener 8 and are disposed of. The clear water 23, which is obtained from the thickener 8, is fed through an intermediate tank 24 and the following line 18 into the suspension tank 3 and used to dilute the underflow 11 of the first hydrocyclone 1. The underflow 16 of the third hydrocyclone 6 is used to produce a limestone suspension 20, which is recycled to the flue gas desulfurizing plant p and is re-used therein to bind sulfur oxides. For safety sake, lines 25, 26 and 27 are provided, which lead into the preceding suspension tank 7.

Figure 2:
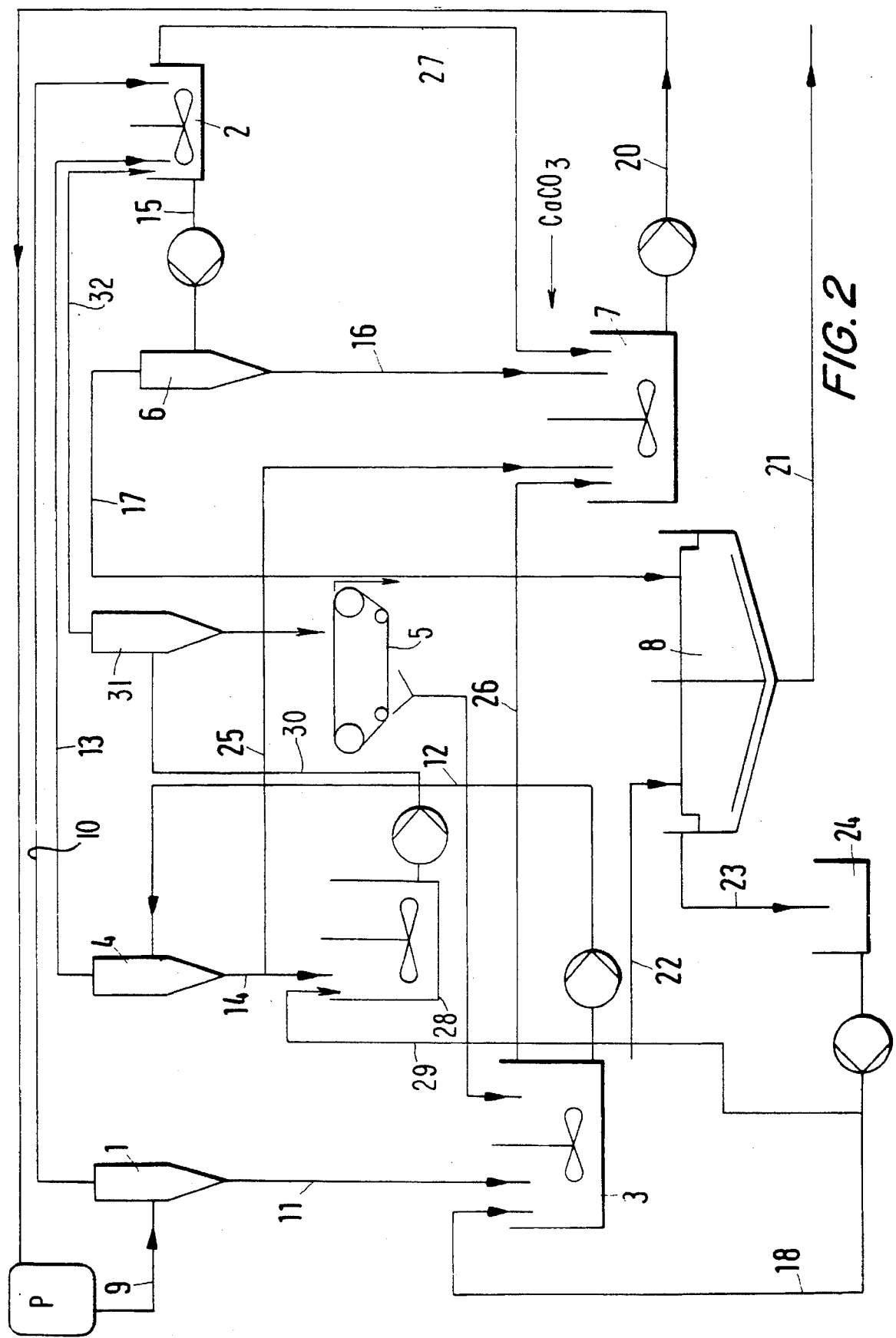

In the example shown in FIG. 2 a gypsum suspension formed in a wet-process flue gas desulfurizing plant with a high content of fly ash or other impurities is fed to the hydrocyclones 1 and 4. The underflow 14 of hydrocyclone 4 which contains 50% by weight solids is then fed to the suspension tank 28 and diluted there also as after the first hydrocyclone stage to a solids content of 10% by weight. For this dilution water is fed from line 29. The suspension of suspension tank 28 is then fed over line 30 to the hydrocyclone 31. The underflow 32 of the hydrocyclone 31 is removed and dewatered by a belt filter 5 and is thus removed from the process. The overflow 32 of the hydrocyclones 31 is together with the overflows 10 and 13 of the hydrocyclones 1 and 4 fed to the suspension tank 2 and treated in the same manner as described in the first example.

As flocculating agents $Na_2S$, $FeCl_3$ or $Al_2(SO_4)_3$ will be used. As aiding flocculating agents polyelectrolytes will be used.

While the invention has been illustrated and described as embodied in a process for purifying gypsum, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A process for purifying gypsum using hydrocyclones, comprising the steps of:
   a) feeding a gypsum suspension to a first hydrocyclone, said first hydrocyclone being operated to produce an overflow of a first hydrocyclone stage and an underflow of a first hydrocyclone stage with an underflow concentration, and subsequently feeding the overflow of the first hydrocyclone stage to a collecting tank;
   b) diluting the underflow of the first hydrocyclone stage in a suspension tank to form another underflow with a lower solids content and then feeding the other underflow with the lower solids content to a second hydrocyclone to form an overflow of a second hydrocyclone stage and an underflow of a second hydrocyclone stage and subsequently feeding the overflow of the second hydrocyclone stage to the collecting tank receiving the overflow of the first hydrocyclone to form a combined overflow;
   c) removing and dewatering a gypsum contained in the underflow of the second hydrocyclone stage; and
   d) supplying the combined overflows from the first and second hydrocyclone stages in the collecting tank to a third hydrocyclone to form an overflow of a third hydrocyclone stage and an underflow of a third hydrocyclone stage and subsequently feeding the overflow of the third hydrocyclone stage to a thickener for removal of solid particles in the overflow and to form a clear water portion, and using the clear water portion for the diluting in step b), using the underflow of the third hydrocyclone to form a limestone suspension.

2. A process according to claim 1, wherein the removing and dewatering of the gypsum in the underflow of the second hydrocyclone stage occurs by belt filter.

3. A process according to claim 1, wherein the removing and dewatering of the gypsum in the underflow of the second hydrocyclone stage occurs by centrifuge.

4. A process according to claim 1, further comprising adding flocculating agents to the overflow of the third hydrocyclone stage in the thickener.

5. A process according to claim 1, in which the underflow of the first hydrocyclone stage has a solids concentration of 60 to 80% by weight and is diluted in the suspension tank to a solids concentration of 5 to 20% by weight, the underflow of the second hydrocyclone stage has a solids concentration of 40 to 60% by weight, the gypsum formed in step c) has a purity of at least 95% by weight and the clear water portion has a solids concentration below 2 g/l.

6. A process according to claim 1, further comprising connecting an additional plurality of hydrocyclones and other associated suspension tanks between the first and second hydrocyclones and operating them analogously to the first hydrocyclone and the associated suspension tank.

7. A process according to claim 1, further comprising obtaining the gypsum suspension used in step a) from a flue gas desulfurizing plant (P) and supplying said limestone suspension to said flue gas desulfurizing plant (P) to bind sulfur oxides generated by said flue gas desulfurizing plant.

8. An arrangement for purifying gypsum from a flue gas desulfurizing plant, comprising a first hydrocyclone stage (1) having a feed line (9) connected to a sump of a flue gas desulfurizing plant (P), an underflow line (11) and an overflow line (10); a collecting tank (2) connected to the overflow line (10) to receive an overflow from the first hydrocyclone stage (1); a suspension tank (3) connected to the underflow line (11) to receive an underflow from the first hydrocyclone stage (1); a second hydrocyclone stage (4) having a feed line (12), an overflow line (13) and an underflow line (14), the collecting tank (2) being connected to the overflow line (13) to receive an overflow from the second hydrocyclone stage and the suspension tank (3) being connected to the underflow line (14) to receive an underflow from the second hydrocyclone stage (4); a third hydrocyclone stage (6) having a feed line (15), an overflow line (17) and an underflow line (16), the collecting tank (2) being connected via the feed line (15) with the third hydrocyclone stage (6) and another suspension tank (7) being connected via the underflow line (16) with the third hydrocyclone stage (6); a thickener means (8) connected to the overflow line (17) to receive overflow from the third hydrocyclone stage (6), said thickener means (8) having an overflow line (23) connected to another tank (24), said other tank (24) being connected with another line (18) to said suspension tank (3).

9. An arrangement as defined in claim 8, further comprising at least one other hydrocyclone and connected suspension tank arranged between the first and second hydrocyclone stages.

* * * * *